Nov. 20, 1962 G. CASPERSEN 3,064,308
CONTINUOUS PRODUCTION OF PROFILED PLASTIC SHEETS
Filed Aug. 27, 1958 3 Sheets-Sheet 1
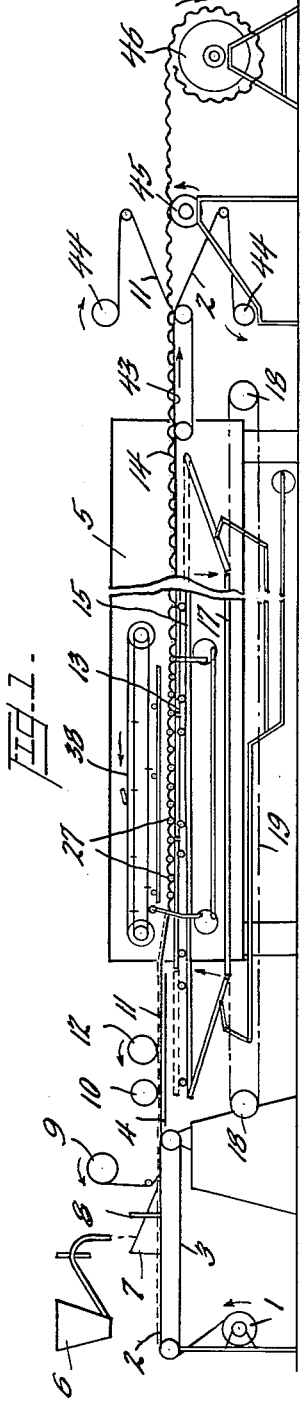
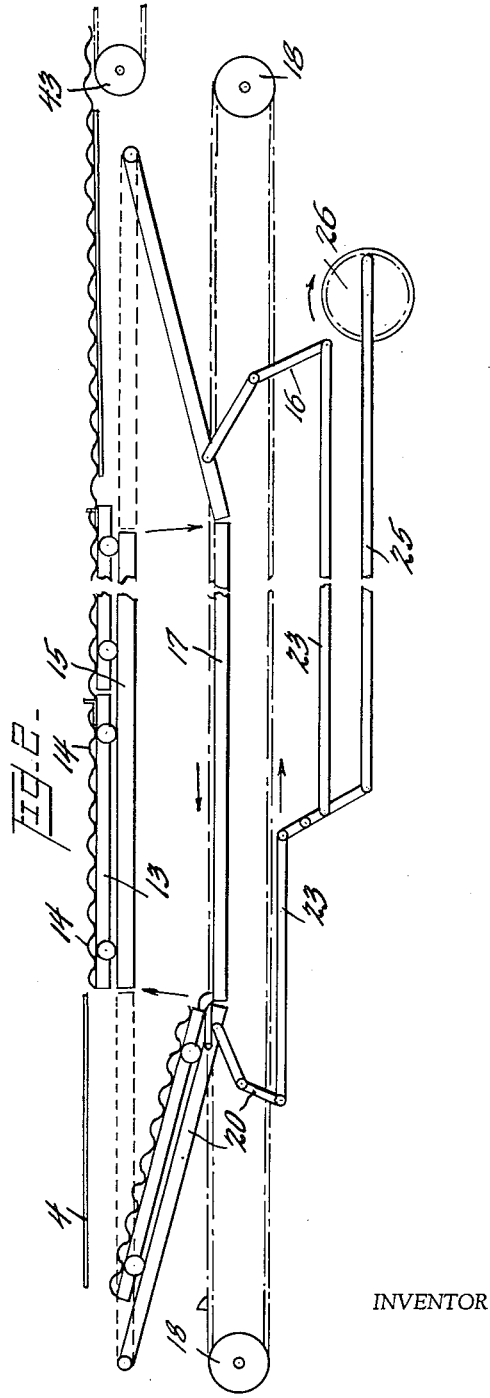
INVENTOR
Gerdt Caspersen,
BY
Watson Cole Grindle & Watson
ATTORNEYS

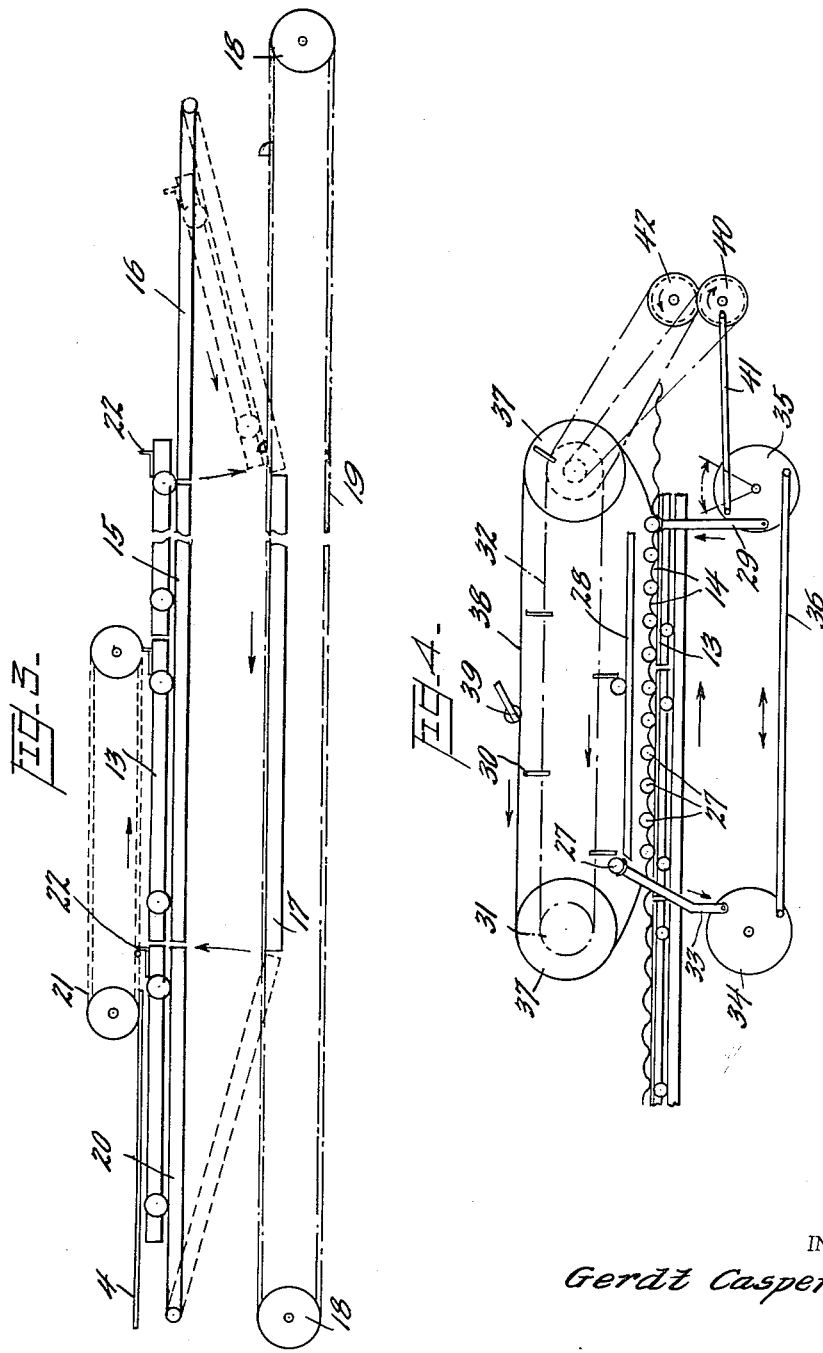

Nov. 20, 1962 G. CASPERSEN 3,064,308
CONTINUOUS PRODUCTION OF PROFILED PLASTIC SHEETS
Filed Aug. 27, 1958 3 Sheets-Sheet 3
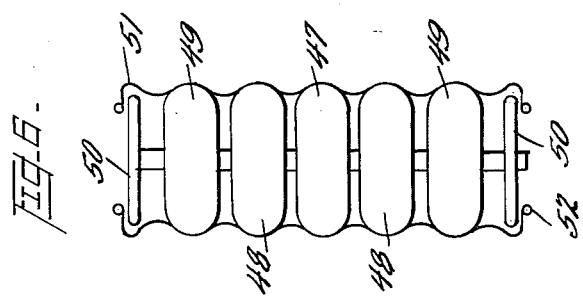
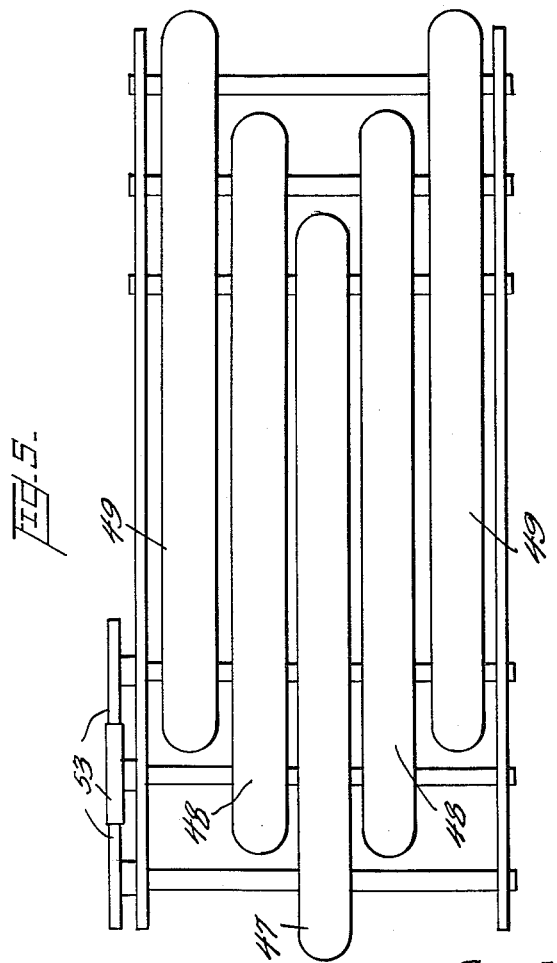
INVENTOR
*Gerdt Caspersen,*
BY
*Watson, Cole, Grindle + Watson*
ATTORNEYS

United States Patent Office 3,064,308
Patented Nov. 20, 1962

3,064,308
CONTINUOUS PRODUCTION OF PROFILED
PLASTIC SHEETS
Gerdt Caspersen, Andernach (Rhine), Germany, assignor to Firma Acoplast Kunststoff-Verarbeitung G.m.b.H., Andernach (Rhine), Germany
Filed Aug. 27, 1958, Ser. No. 757,506
Claims priority, application Germany Apr. 30, 1958
4 Claims. (Cl. 18—19)

The invention relates to the continuous production of profiled plastic sheets, especially of unsaturated polyester resins re-inforced with fibrous materials such as fibre-glass matting.

The profiling of the sheets depends on the purpose for which they will subsequently be used. For example, if corrugated sheets are to be produced for constructional purposes, then the sheets must be provided with longitudinal or transverse corrugations. The production of longitudinally corrugated sheets was hitherto carried out by pulling the sheets under suitable pressure over a former provided with the longitudinal corrugations required. For the production of transversally corrugated sheets, it has been proposed to use roller chains running in opposite directions, the sheet being fed between their profiling rollers. Thus, the production of longitudinally corrugated sheets necessitated the use of machines of a different type or apparatus of a basically different kind from that required for the production of transversely corrugated sheets.

This invention provides apparatus for the production of profiled sheets of fibre-reinforced plastic material, which comprises means for feeding the material through a profiling region, rectangular profiling plates having the profile to be imparted to the material and arranged to bear against the underside of the material within the profiling region, supporting trolleys upon which the profiling plates are detachably mounted, guide means upon which the trolleys can run in the direction of movement of the material, driving means for the trolleys, and upper profiling means arranged to bear against the upper surfaces of the material within the profiling region and to cooperate with the profiling plates to impart the desired profile to the material.

The fact that the profile plates are detachably mounted enables the apparatus to be used for forming different profiles by changing the profile plates.

Advantageously, the profiling plates and the supporting trolleys are of square shape, and the profiling plates can be mounted on the trolleys so that either pair of opposite edges of each profiling plate extend in a direction parallel to the direction of movement of the material. This enables the profile imparted to the material to be changed by changing the orientation of the profile plates relative to the direction of movement of the trolleys. Thus, for example, the same profile plates can be used for the formation of both longitudinal and transverse corrugations.

Advantageously, there is provided return guide means for the trolleys, means for lowering the trolleys on to the return guide means after the trolleys have passed through the profiling region, and means for raising the trolleys from the return guide means on to the first-mentioned guide means at a point in advance of the profiling region. Preferably, there is provided driving means for the raising and lowering means, which is such that the raising and lowering means operate at the same time.

The driving means for the trolleys may comprise an endless belt and means for the trolleys comprises an endless chain and means on the trolleys for engaging the chain. Advantageously, the driving means for the trolleys is such that engaging means on only a single trolley is in engagement with the endless chain at any one time, the said single trolley being arranged to push the trolleys preceding it.

The apparatus of the invention is especially suitable for the production of corrugated sheets and for this purpose the profile plates have a corrugated profile.

For the production of transversely corrugated sheets, the profiling plates are arranged with their corrugations extending in a direction parallel to the direction of movement of the trolleys through the profiling region and, advantageously, the upper profiling means comprises a plurality of bars that extend in the same direction as the corrugations in the profiling plates, and there is provided means for lowering the bars into the depressions in the profiling plates when they enter the profiling region and lifting the bars out of the depressions after they have left the profiling region. The upper profiling means preferably includes means for returning the bars to the front of the profiling region after they have been lifted clear of the material to the rear of the profiling region.

Advantageously, the upper profiling means includes an endless belt of which the lower run is arranged to be interposed between the bars and the sheet material in the profiling region. The belt, the tension in which can advantageously be varied, serves to ensure that the upper profiling means exerts a pressure on the ridges as well as the depressions of the corrugations formed in the material.

For the production of longitudinally corrugated sheets, the profiling plates are arranged with their corrugations extending in a direction parallel to the direction of movement of the trolleys through the profiling region and, advantageously, the upper profiling means comprises a plurality of endless flexible weighted tubes mounted on rotatable supporting means and arranged so that the lower runs of the tubes rest in the depressions in the profiling plates. The endless flexible tubes are preferably arranged so that the leading edges of the tubes are in echelon in such a way that the leading edge of a central tube meets the sheet material first.

Advantageously, the upper profiling means includes discs mounted on or coaxially with rotatable supporting means for the tubes and beyond the outermost tubes, and an endless band which is supported by the discs and envelopes the tubes. The endless band serves to ensure that the upper profiling means exerts a pressure on the ridges as well as the depressions of the corrugations formed in the material. Preferably, there is provided means for tensioning the endless band in a transverse direction.

In order to enable the apparatus to be used for forming either transverse or longitudinal corrugations, the upper profiling means is preferably removable from the apparatus as a unit.

Two forms of apparatus constructed in accordance with the invention will now be described by way of example in greater detail with reference to the accompanying drawings in which:

FIG. 1 is a schematic side elevation of one form of the apparatus;

FIGS. 2 and 3 are fragmentary side elevations of parts common to both forms of the apparatus;

FIG. 4 is a fragmentary side elevation of the upper profiling means of the form of apparatus shown in FIG. 1; and FIG. 5 and FIG. 6 are a fragmentary plan and end view respectively of the upper profiling means of the second form of apparatus.

Referring to FIG. 1 of the drawings, a carrier film 2 drawn from a reel 1 is placed on an endless revolving conveyor belt 3 and from this is fed to a slide plate 4, which precedes a heating chamber 5, in which profiling takes place. The required quantity of resin is transferred to the carrier film at 6, and side rails 7 are provided to prevent the resin running off at the sides. The strength of the resin sheet can be regulated by means of a measuring rail 8, which is mounted so that its height can be adjusted. A reinforcing insert is then placed on the resin sheet, being in this case in the form of a glass mat drawn from a reel 9. This is immersed in the fluid resin and the air contained in the mat is therefore allowed to escape. When the glass mat is fully soaked with resin after a sufficiently long run, a covering film drawn from a reel 10 is applied, and side rollers 12 stick the edges of the two films 2 and 11 together and squeeze the excess resin from the glued edges.

The rollers 12, which are driven, also serve to feed the laminated sheet to the region within the heating chamber 5 in which the profiling takes place. The drive for the rollers 12 and the conveyor band 3 are coupled together so that they feed at the same rate.

From the slide plate 4, the laminated sheet passes to the heating chamber 5, in which profiling now takes place. For this purpose, profiling members are brought to bear on the sheet from above and below. The lower profiling members, which are in the form of square corrugated plates 14, are carried by square trolleys 13 which travel in the direction of feed of the sheet material and on which the profiling plates 14 are detachably mounted. In this way, it is possible, by means of simple interchange of the profiling plates 14, to arrange the apparatus for the production of sheets profiled according to requirements. By using square trolleys and corresponding square profiling plates, the changeover from the production of transversely corrugated sheet to that of longitudinally corrugated sheets is effected simply by swivelling the profiling plates by 90°.

Side guide tracks 15 are provided for feeding the individual trolleys 13, these being supported on the tracks by means of rollers. When the trolleys reach the end of their feed track, they are lowered to underneath guide tracks 17 by means of an endless rope 19 running on rollers 18 to a lifting device 20, which lifts them up again to the upper guide tracks 15. The trolleys are propelled forwards by a conveyor chain 21 (see FIG. 3), which is arranged at the trolley lifting point and engages with the carriers 22 of the trolleys 13. The drive is thereby limited to the first trolley each time, whilst the preceding ones push each other forward, any gasps between the individual trolleys thereby being closed automatically. The lowering device 16 is so connected with the lifting device 20 that when one trolley is lowered, another is raised. For this purpose the pivot levers 16, 20 of the lowering and lifting devices are connected with each other by means of a mechanical rod arrangement 23, 24 (see FIG. 2) on the lever 24 of which a crank drive 25, 26 acts.

The pressing of the sheet material into the depressions of the corrugated profiling plates 14, which is necessary for profiling, is effected by a number of profiling bars 27 (see FIG. 4), which are deposited in the depressions of the lower profiling plates 14 of the first trolley each time at the beginning of the profiling region in a rhythm determined by the feed movement, and are lifted out again at the end of the forming section. For this purpose, the feed rate of the conveyor belt 3 and the rollers 12 is so adjusted that a fold is formed in the material immediately in front of the heating chamber in the same rhythm, this fold being taken up when the sheet is pressed into the individual depressions. A collecting rail 28 is provided for returning the profiling bars which have been lifted out to the beginning of the forming section.

The profiling bars 27 are lifted on to this by means of a lifting lever 29 at the end of the forming section and are fed along this by means of an endless conveyor chain 32 running over sprockets 31 back to the beginning of the forming section, where they are deposited by means of a depositing lever 33 in the next depression in the profiling plate 14. Here again, the depositing lever 33 with its crank drive 34 and the lifting out lever 29 with its crank drive 35 are so connected by means of a connecting rod system 36, that as one bar is deposited another is lifted out simultaneously. The bar system 27 is conveyed by an endless tension band 38 running over rollers 37, the lower run of which runs under the profiling bars 27, so that an even pressure is exerted even over the ridges of the corrugated lower profiling plates on the sheet material between. It is possible by means of the tension roller 39 to regulate the pressure exerted on the corrugated sheet by the tension band 38. Drive of the whole mechanism is by the driving pulley or driving gear 40, which operates the depositing and lifting out mechanisms through a bar 41, and from which the drive is taken for the tension band 38 and the conveyor chain 32 through the driving disc or driving gear 42.

This upper profiling means is constructed so that it can be withdrawn from and inserted into the apparatus as a single unit.

After passing through the profiling region, in which the actual forming of the hitherto even sheet into a corrugated sheet takes place, the hardening of the sheet takes place on the remainder of the trolleys' journey through the heating chamber 5. After passing through the heating chamber, the sheet is then transferred to a conveyor belt 43, at which point the films 2 and 11 are stripped off by means of reels 44 provided with sliding couplings. Side separating discs 45 then cut off the sheet material into the required lengths, which are finally wound on to a reel 46 at the end of the line.

The second form of apparatus, which is arranged to form longitudinal corrugations, is the same as the first form except that the profiling plates 14 are arranged with their corrugations extending longitudinally and the upper profiling unit shown in FIG. 4 is replaced by that shown in FIGS. 5 and 6.

Referring to FIGS. 5 and 6, the upper profiling unit comprises several endless tubes 47, 48, and 49, which extend in the direction of movement of the trolleys 13 through the profiling region and run on rollers. The tubes 47, 48 and 49 are filled with a heavy substance and are arranged so that the leading ends of the tubes (the lefthand and as seen in FIG. 5) are in echelon with the central tube 47 leading. Thus the central tube 47 begins the profiling process first and the adjacent tubes 48 and the outer tubes 49 follow in succession.

At the ends of the roller spindles, supporting discs 50 are fitted, over which runs an endless band 51, which can be tensioned transversely by a spring band 52.

This tension band serves the purpose of exerting an even pressure on the material being profiled, even over the ridges of the corrugation. The rollers on which the tubes 47, 48 and 49 run are driven through gears 53.

This upper profiling means is constructed so that it can be inserted into or withdrawn from the apparatus as a single unit.

Because the two forms of apparatus described differ from one another only in the form of the upper profiling means, which in each case can be inserted or withdrawn as a single unit, and in the orientation of the profiling plate 14, which can easily be changed, it is only necessary, in order to be able to form both longitudinal and transverse corrugations, to have a single apparatus together with an additional upper profiling unit.

What I claim is:

1. Apparatus for the continuous production of corrugated sheet material of fiber-reinforced plastic, comprising means for feeding the material to be corrugated, rectangular profiling plates having the profile to be imparted to the material and arranged to bear against the underside of the material, supporting trolleys upon which the profiling plates are detachably mounted, guide means for the trolleys so that the latter may run in the direction of movement of the material, driving means for the trolleys, upper profiling means to bear against the upper surface of the material and cooperating with the profiling plates to impart the desired corrugations to the material, means under the guide means for the trolleys to return the latter after corrugation of the sheet material, the profiling plates being arranged with their corrugations extending in a direction perpendicular to the direction of movement of the trolleys through the corrugating step, the upper profiling means comprising a plurality of bars which extend in the same direction as the corrugations in the profiling plates, and means for lowering the bars into the depressions in the profiling plates and lifting the bars out of the depressions after they have left the corrugating step.

2. Apparatus for the continuous production of corrugated sheet material of fiber-reinforced plastic, comprising means for feeding the material to be corrugated, rectangular profiling plates having the profile to be imparted to the material and arranged to bear against the underside of the material, supporting trolleys upn which the profiling plates are detachably mounted, guide means for the trolleys so that the latter may run in the direction of movement of the material, driving means for the trolleys, upper profiling means to bear against the upper surface of the material and cooperating with the profiling plates to impart the desired corrugations to the material, means under the guide means for the trolleys to return the latter after corrugation of the sheet material, the profiling plates being arranged with their corrugations extending in a direction parallel to the direction of movement of the trolleys, and the upper profiling means comprising a plurality of endless flexible and weighted tubes mounted on rotatable supporting means and arranged so that the lower runs of the tubes rest in the depressions in the profiling plates.

3. Apparatus for the continuous production of corrugated sheet material of fiber-reinforced plastic, comprising means for feeding the material to be corrugated, rectangular profiling plates having the profile to be imparted to the material and arranged to bear against the underside of the material, supporting trolleys upon which the profiling plates are detachably mounted, guide means for the trolleys so that the latter may run in the direction of movement of the material, driving means for the trolleys, upper profiling means to bear against the upper surface of the material and cooperating with the profiling plates to impart the desired corrugations to the material, means under the guide means for the trolleys to return the latter after corrugation of the sheet material, the profiling plates being arranged with their corrugations extending in a direction parallel to the direction of movement of the trolleys, and the upper profiling means comprising a plurality of endless flexilbe and weighted tubes mounted on rotatable supporting means and arranged so that the lower runs of the tubes rest in the depressions in the profiling plates, the endless flexible tubes being arranged so that the leading edge of a central tube meets the sheet material before the other tubes.

4. Apparatus for the continuous production of corrugated sheet material of fiber-reinforced plastic, comprising means for feeding the material to be corrugated, rectangular profiling plates having the profile to be imparted to the material and arranged to bear against the underside of the material, supporting trolleys upon which the profiling plates sare detachably mounted, guide means for the trolleys so that the latter may run in the direction of movement of the material, driving means for the trolleys, upper profiling means to bear against the upper surface of the material and cooperating with the profiling plates to impart the desired corrugations to the material, means under the guide means for the trolleys to return the latter after corrugation of the sheet material, the profiling plates being arranged with their corrugations extending in a direction parallel to the direction of movement of the trolleys, and the upper profiling means comprising a plurality of endless flexible and weighted tubes mounted on rotatable supporting means and arranged so that the lower runs of the tubes rest in the depressions in the profiling plates, the upper profiling means including discs mounted coaxially with the rotatable supporting means for the tubes and beyond the outermost tubes, and an endless band supported by the discs and enveloping the tubes.

References Cited in the file of this patent

UNITED STATES PATENTS

| | | |
|---|---|---|
| 690,713 | Ferres | Jan. 7, 1902 |
| 1,672,092 | Russell | June 5, 1928 |
| 1,859,354 | Buttress | May 24, 1932 |
| 1,883,964 | Kramer | Oct. 25, 1932 |
| 1,900,427 | Clapp | Mar. 7, 1933 |
| 2,292,366 | DeWyk | Aug. 11, 1942 |
| 2,350,996 | Atkinson et al. | June 13, 1944 |
| 2,356,244 | Johnson | Aug. 22, 1944 |
| 2,547,880 | Meyer et al. | Apr. 3, 1951 |
| 2,655,196 | Magnani | Oct. 13, 1953 |
| 2,724,214 | Guilleminot | Nov. 22, 1955 |
| 2,784,763 | Shorts | Mar. 12, 1957 |